Patented Nov. 28, 1950

2,532,242

UNITED STATES PATENT OFFICE 2,532,242

POLYSTYRENE FOAMS

John B. Ott, Dayton, Ohio, assignor to Monsanto Chemical Company, St. Louis, Mo., a corporation of Delaware No Drawing. Application July 9, 1949, Serial No. 103,964

4 Claims. (Cl. 260—2.5)

This invention relates to foam resins. More particularly, it relates to foam polymers and copolymers of styrene.

One object of this invention is to provide foamed polystyrene resins.

Another object is to provide fusible but insoluble polystyrene foams.

Still another object is to provide a process for preparing insoluble polystyrene foams.

These and other objects are attained by incorporating diphenyl-4,4'-di(sulfonyl azide) in a polymerized styrene resin and thereafter heating the mixture at 140 to 150° C.

The following example is given in illustration and is not intended as a limitation on the scope of this invention.

Example I

A polymerized styrene in particulate form having a molecular weight of about 60,000 to 70,000 was mixed dry with 4% weight of diphenyl-4,4'-di(sulfonyl azide). The mixture was malaxated on hot milling rolls at about 120 to 130° C. until the diphenyl-4,4'-di(sulfonyl azide) was thoroughly dispersed throughout the polystyrene resin. The product was an opaque mass which showed no signs of decomposition or foam production. It was soluble in toluene. This opaque mass was next heated in an open mold at about 145° C. for approximately 1 hour to produce an opaque slightly yellow foam having a specific gravity of about 0.4. The foam was fusible at 170° C. but was substantially insoluble in toluene.

Diphenyl-4,4'-di(sulfonyl azide) is a new compound which is described and claimed in my copending application, Serial Number 103,962, filed July 9, 1949 now U. S. Patent 2,518,249. The compound may be prepared by reacting diphenyl with chlorosulfonic acid or sulfuryl chloride followed by reaction with an inorganic azide. It is stable at temperatures up to 140° C. and its decomposition between 140 and 150° C. may be easily controlled. Its stability at temperatures below 140° C. make it particularly valuable for incorporation into polystyrene resins since such incorporation is preferably carried out at elevated temperatures, i. e., about 100 to about 135° C. by malaxation on heated roll mills, in heated Banbury mixers or other conventional milling machines.

The amount of the azide to be used may be varied between about 1% to 25% or more by weight based on the total weight of the resin. Less than 1% is ineffective both for forming foams and for insolubilizing the resin. Above 25%, little advantage is gained by using the excess. Between 1 and 25%, the amount used will depend on the required properties of the finished foams. Larger quantities produce foams having lower specific gravities if the foaming takes place in an open mold. In a closed mold, the larger quantities develop more and smaller bubbles. Conversely, quantities near the lower point of the critical range yield foams having higher specific gravities. Furthermore, the amount of azide used will determine the degree of cross-linking obtained. At 25% azide, the foams will be rigid and brittle. At 4% azide, tough resilient foams may be obtained which are insoluble in known solvents for the resins.

The temperature of the foaming step will also affect the type and nature of the foams produced. The foaming step must be carried out at 140 to 150° C. Below 140° C., substantially no decomposition of the azide occurs. Above 150° C., decomposition becomes uncontrollable and reproducible results cannot be obtained. Whereas temperatures as low as 140° C. may be used, the time cycle is unnecessarily long. It is preferred to foam the resins at 144 to 146° C. which is the temperature at which the pure azide decomposes spontaneously when placed on a melting point bar. In this temperature range the decomposition is rapid but does not get out of hand and results obtained are easily reproducible.

The foam resins of this invention are polymers of styrene or copolymers thereof in which the styrene constitutes at least 75% by weight of the total. Furthermore, the invention is restricted to such styrene polymers and copolymers which are useful as molding powders, more particularly polymers and copolymers having an average molecular weight of between 40,000 and 90,000 as determined by the Staudinger equation. Materials which may be copolymerized with styrene to produce resins useful in this invention are alpha alkyl derivatives of styrene such as alpha methyl styrene, alpha ethyl styrene, etc.; ring substituted derivatives of styrene which are polymerizable with styrene such as the mono-, di-, and tri-chlorostyrenes, methyl styrenes, dimethyl styrene, etc.; acrylic esters such as ethyl acrylate; methacrylic esters such as propyl methacrylate; acrylonitrile; methacrylonitrile; alpha beta ethylenically unsaturated dibasic acids and their derivatives such as maleic acid, fumaric acid, itaconic acid, and esters, amides and nitriles thereof; diolefins such as butadiene, isoprene, cyclopentadiene, etc. In other words, any copolymer of styrene and at least one other monomer copolymerizable therewith in which copolymer styrene constitutes at least 75% by weight of the total may be foamed according to the process of this invention provided said copolymer is fusible at 100 to 150° C.

The styrene polymers and copolymers may be modified by the addition of conventional ingredients such as plasticizers, pigments, dyes, fillers, lubricants, etc. prior to the foaming operation.

The process and products of this invention are particularly advantageous in that the process permits the preparation of substantially insoluble foams from soluble thermoplastic styrene polymers and copolymers under controlled conditions and the products are stable foams having all the valuable properties of styrene resins without the disadvantages of solubility.

The foamed resins may be used for insulation in refrigerators and deep freeze units. They may also be employed as fillers for lifebelts, buoys and other apparatus designed to be buoyant in water over long periods of time.

It is obvious that many variations may be made in the products and processes of this invention without departing from the spirit and scope thereof as defined by the appended claims.

What is claimed is:

1. A process for preparing an insoluble foamed product which comprises mixing from 1 to 25 parts of diphenyl-4,4'-di(sulfonyl azide) with 100 parts of polystyrene resin and then heating the mixture at 140 to 150° C.

2. A process as in claim 1 wherein the polystyrene resin is a copolymer of styrene containing at least 75% styrene by weight with an unsaturated monomer copolymerizable therewith said copolymer being fusible at 100 to 150° C.

3. An insoluble foam product obtained by heating a mixture of 100 parts of polystyrene and from 1 to 25 parts of diphenyl-4,4'-di(sulfonyl azide) at 140 to 150° C.

4. A product as in claim 3 wherein the polystyrene resin is a copolymer of styrene in which the styrene constitutes at least 75% by weight of the copolymer said copolymer being fusible at 100 to 150° C.

JOHN B. OTT.

REFERENCES CITED

The following references are of record in the file of this patent:

UNITED STATES PATENTS

| Number | Name | Date |
| --- | --- | --- |
| 2,386,995 | Wigal | Oct. 16, 1945 |